Feb. 18, 1958     H. M. SNYDER ET AL     2,824,206
DOMESTIC APPLIANCE

Filed Feb. 21, 1957     3 Sheets-Sheet 1

INVENTOR.
Harold M. Snyder
BY Byron L. Brucken

Edwin L. Dybvig
Their Attorney

Feb. 18, 1958  H. M. SNYDER ET AL  2,824,206
DOMESTIC APPLIANCE
Filed Feb. 21, 1957  3 Sheets-Sheet 2

INVENTOR.
Harold M. Snyder
BY Byron L. Brucken

Edwin S. Dybvig
Their Attorney

Feb. 18, 1958 H. M. SNYDER ET AL 2,824,206
DOMESTIC APPLIANCE
Filed Feb. 21, 1957 3 Sheets-Sheet 3
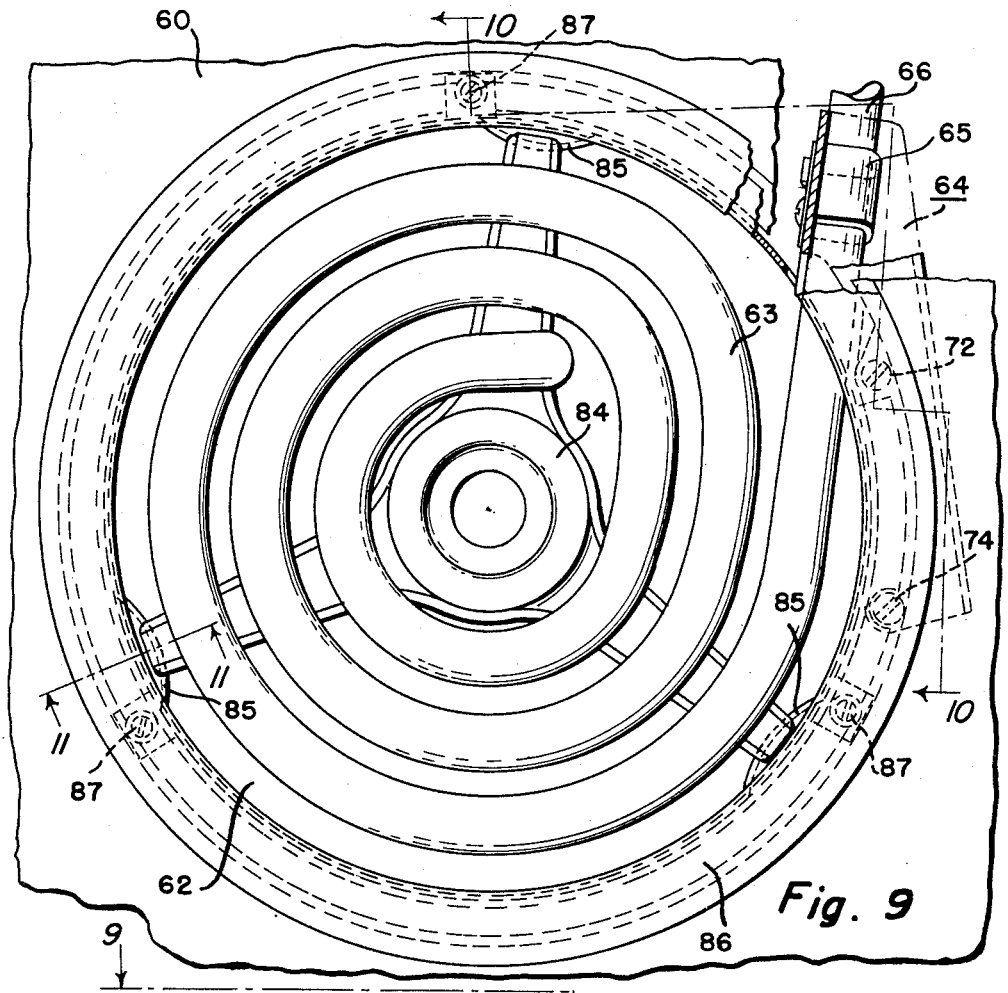
Fig. 9
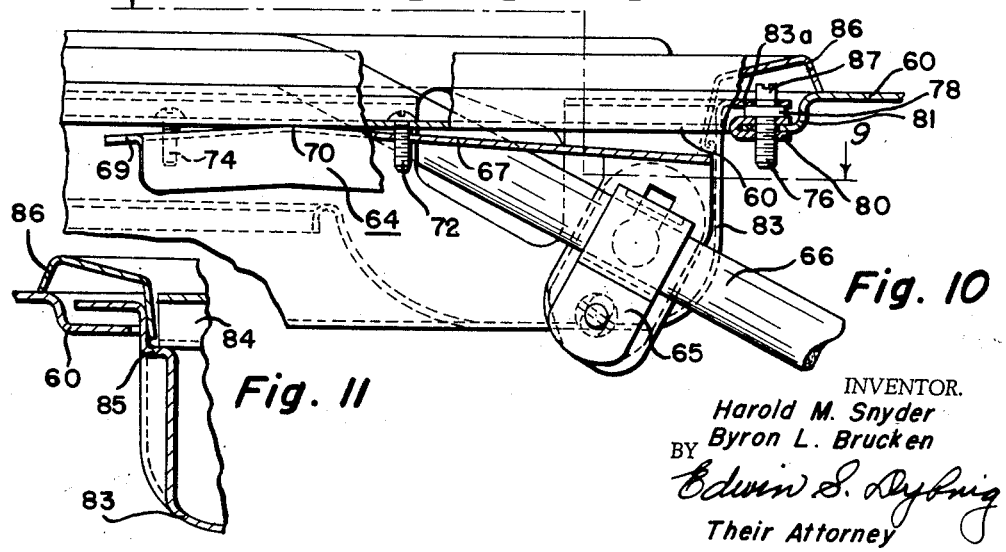
Fig. 10
Fig. 11
INVENTOR.
Harold M. Snyder
Byron L. Brucken
BY
Edwin S. Dybvig
Their Attorney United States Patent Office 2,824,206
Patented Feb. 18, 1958

2,824,206

DOMESTIC APPLIANCE

Harold M. Snyder, Springfield, and Byron L. Brucken, Dayton, Ohio, assignors to General Motors Corporation, Detroit, Mich., a corporation of Delaware Application February 21, 1957, Serial No. 641,686

10 Claims. (Cl. 219—37)

This invention relates to a domestic appliance and more particularly to a leveling arrangement for an electric heating unit.

In cooking with electric heating units, one of the problems encountered by the user is the proper leveling of the electric heating unit in relation to its support in order to provide a level cooking surface. When cooking surfaces are not level, the food to be cooked is often burned especially in frying operations where an uneven distribution of frying liquid is brought about in the cooking utensil due to the fact that the heating unit is not level. In many instances the heating unit may leave the place of production in an unlevel condition, or if in a level condition, the heating unit may become unlevel during shipment or after some use of the heating unit.

It is accordingly an object of this invention to provide means for leveling the heating unit at the place of production or at a subsequent time by the employment of adjustable means which, when adjusted, properly orient the heating unit to a level condition. The adjustable means preferably takes the form of a plurality of adjusting screws interposed between the heating unit and its support for leveling the heating unit. The adjusting screws are so positioned as to be readily accessible from the top side of the heating unit support. This is important as in most cases it is difficult to gain access to the underside of the heating unit support for adjustment purposes.

Another object of the invention is to provide a heating unit assembly wherein the heating unit is pivotally connected to its support and wherein adjusting screws are provided for leveling the heating unit.

Still another object is to provide a heating unit arrangement wherein the heating unit is pivotally connected to its support and wherein the pivotal connection between the heating unit and its support also permits movement of the heating unit upwardly and downwardly with respect to its support, there being adjusting screws interposed between the heating unit and its support for leveling the heating unit.

A further object is to provide a heating unit arrangement wherein the heating unit is pivoted to a bracket that is in turn tiltably supported by a heating unit support.

Further objects and advantages of the present invention will be apparent from the following description, reference being had to the accompanying drawings, wherein a preferred form of the present invention is clearly shown.

In the drawings:

Figure 9 is a top plan view, with parts broken away, of a modified heater leveling arrangement;

Figure 10 is a side view, with parts broken away, taken along line 10—10 of Figure 9; and Figure 11 is a vertical sectional view taken along line 11—11 of Figure 9.

Figure 1:
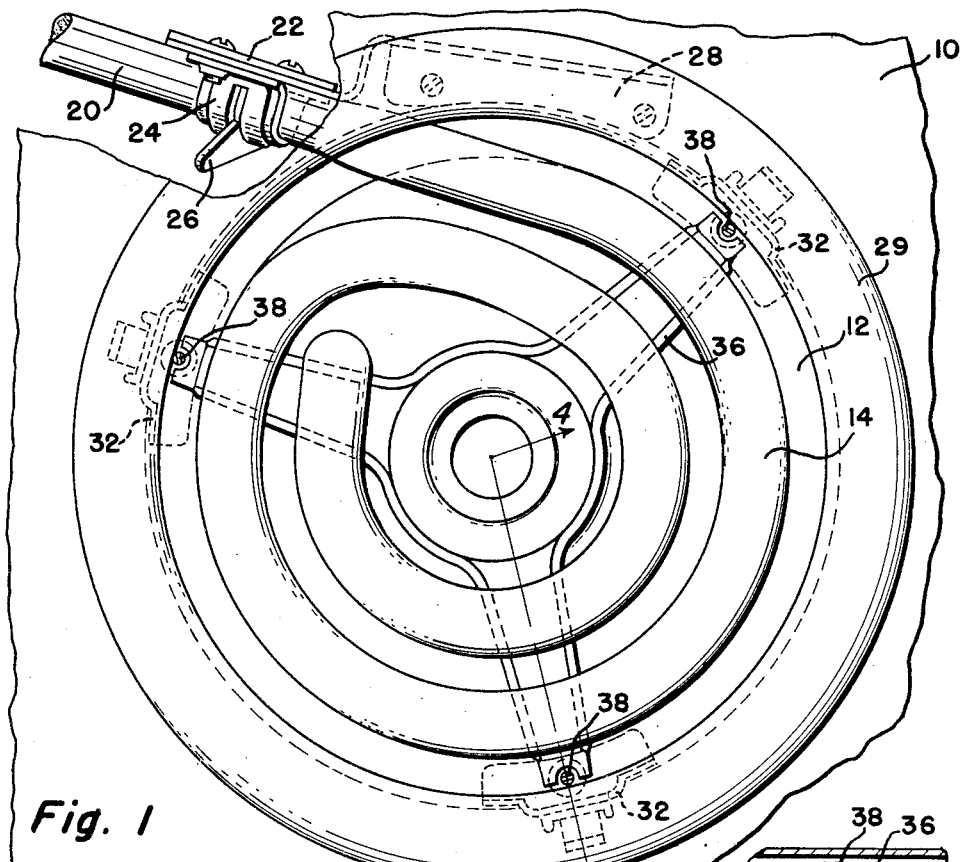
Figure 1 is a top plan view, with parts broken away, of a heating unit made in accordance with this invention.
Figures 2, 3, 5:
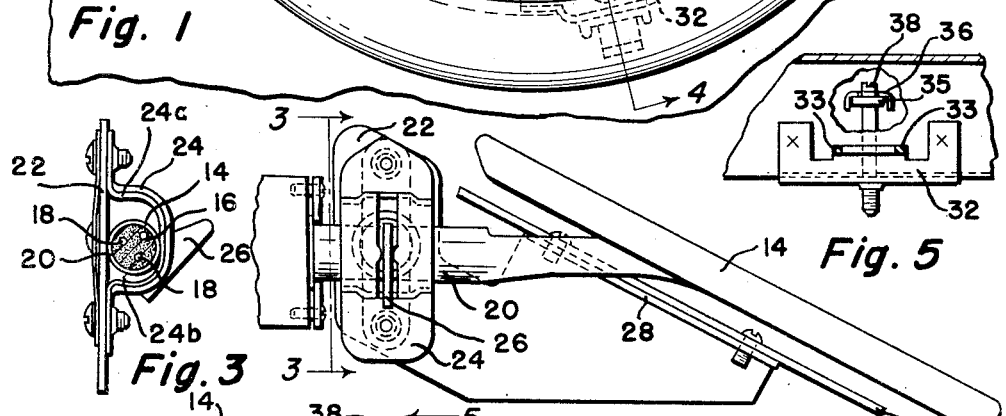
Figure 2 is a side view of the heating unit of this invention showing the angular relationship between the cooking surface of the unit and the downwardly extending portion of the unit.
Figure 3 is a sectional view taken along line 3—3 of Figure 2.
Figure 5 is a sectional view, with parts broken away, taken along line 5—5 of Figure 4.
Figure 4:
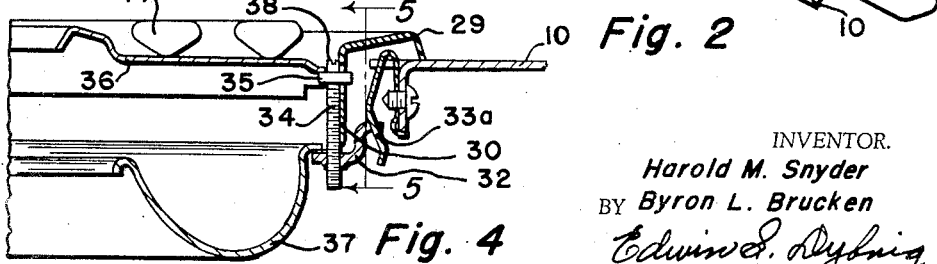
Figure 4 is a sectional view taken along line 4—4 of Figure 1.

Referring to the drawings and more particularly to Figs. 1 through 5, a heating unit arrangement is shown including a horizontal cooking top 10 having an opening 12 that receives a heating unit 14. The cooking top 10 preferably forms the top wall of an electric range, the remainder of which is not shown, although it is apparent that the cooking top may be an integral part of any electric heating apparatus. The heating unit 14 is of the tubular sheath type having a filling of insulating material 16 of magnesium oxide or the like and having a plurality of electric resistance wires 18. The heating unit is spirally shaped as shown in Fig. 1 and this portion of the heating unit forms the utensil supporting cooking surface. The heating unit 14 is also provided with a cylindrically shaped, downwardly extending portion 20 that fits within a bracket 22 to which is secured a U-shaped clamp member 24. A lug 26 secured to the downwardly extending portion 20 of the heating unit 14 fits within a slot formed in the clamp 24 to prevent longitudinal movement of the lower portion 20 of the heating unit. The bracket 22 includes a flanged portion 28 that is bolted to the underside of the cooking top 10. With this arrangement the downwardly extending portion 20 of the heating unit is rotatably secured between the bracket 22 and the U-shaped clamp 24. The lower portion 20 of the heating unit may thus rotate around its longitudinal axis and provides a means whereby the cooking surface portion of the heating unit 14 may be moved upwardly in Fig. 1 away from the cooking top 10 for cleaning purposes. The cooking surface of the heating unit thus may move from a horizontal position to a vertical position due to the fact that the lower portion 20 of the heating unit is rotatably mounted between bracket 22 and U-shaped clamp 24. It should be noted that the leg portions 24a and 24b of the U-shaped clamp 24 shown in Fig. 3 are sufficiently spaced to provide for up-and-down movement of the lower portion 20 of the heating unit. The heating unit thus may pivot around the longitudinal axis of the lower portion 20 and also may move upwardly and downwardly within U-shaped bracket 24.

An annular trim ring 29 having a downwardly extending portion 30 rests on the cooking top 10 and circumscribes the opening 14 formed in the cooking top. The trim ring 29 carries brackets 32 which are welded or otherwise secured thereto. The brackets 32 are provided with ears 33 which position the trim ring 29 relative to springs 33a when the brackets 32 are snapped onto the springs. Each bracket 32 carries an adjusting bolt 34 which is threaded into the bracket and which is formed with a ledge portion 35. The ledge portions 35 support a spider 36 which engages the heating unit 14 when the heating unit is in its horizontal position. The heating unit assembly also includes a reflector bowl 37 that rests on the brackets 32.

When it is desired to level the heating unit 14 the adjusting screws 34 are rotated by the insertion of a screwdriver into the slotted head portions 38 of the adjusting screws 34. The rotation of the adjusting screws 34 vertically shifts the spider 36 which, due to its contact with heating unit 14, vertically adjusts the height of heating unit 14 with respect to cooking top 10. It is noted that three adjusting screws are shown located 120° apart and this arrangement insures proper leveling of the heating unit 14. The fit between the lower portion 20 of the heating unit and the bracket 22 and clamp 24 is made sufficiently loose so that the heating unit may move up and down when the adjusting screws are rotated. The arrangement for leveling the heating unit 14 is particularly adapted for simplified adjusting procedure due to the fact that the slotted head portions 38 of adjusting screws 34 are accessible from the top side of cooking top 10. Thus, it is not necessary to go beneath cooking top 10 to level the heating unit 14, nor is it necessary to pivot the heating unit out of the opening 12 in order to level the heating unit. The heating unit may thus be adjusted while it is in its operative position and wherein movement of the heating unit may be readily observed during the adjusting procedure.

Figure 6:
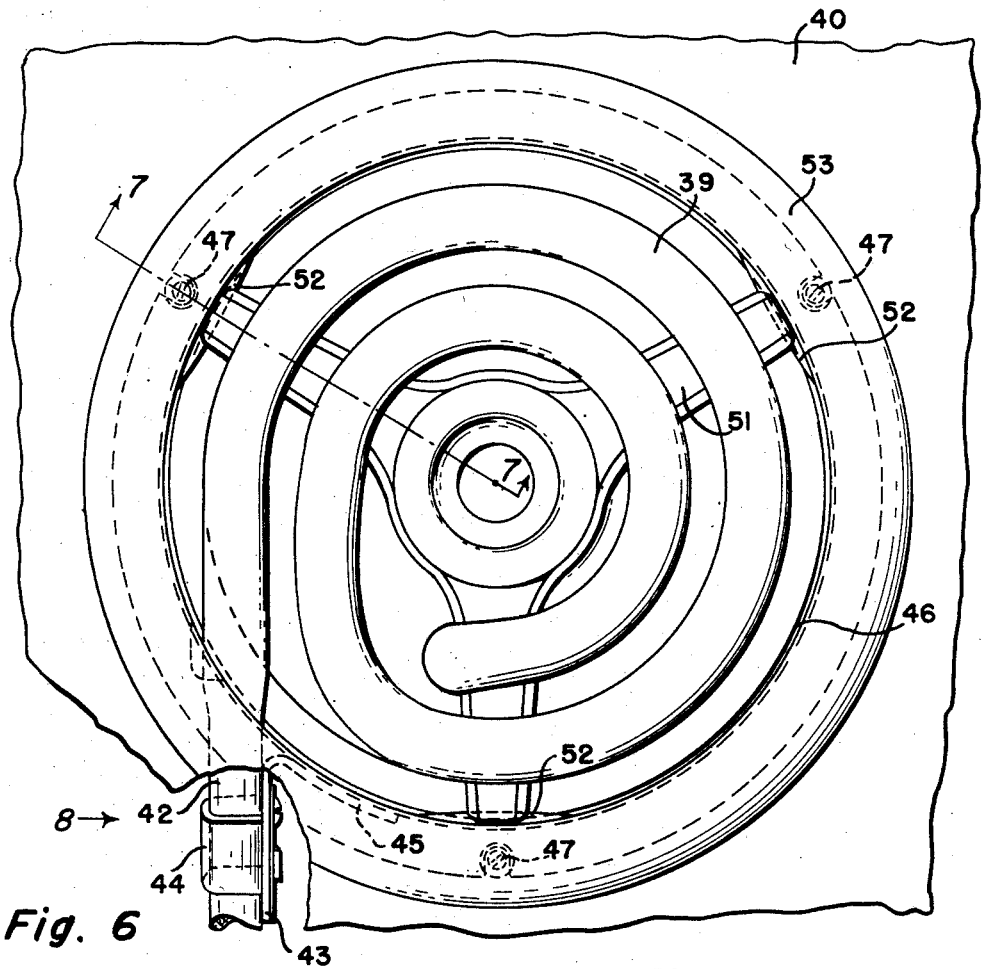
Figure 6 is a top plan view, with parts broken away, of a modified surface heater leveling arrangement.
Figure 7:
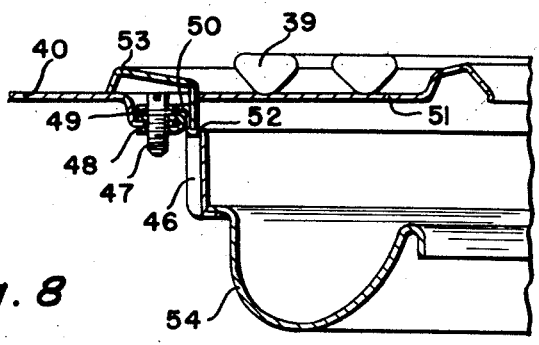
Figure 7 is a sectional view taken along line 7—7 of Figure 6.
Figure 8:
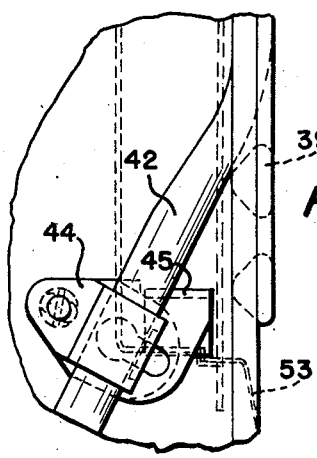
Figure 8 is a side view of the heating unit shown in Figure 6 showing the angular relationship of the cooking surface of the unit and the downwardly extending portion of the unit.

A modified heating unit leveling arrangement is illustrated in Figs. 6, 7 and 8. In this arrangement an electrical heating unit 39 of the tubular sheath type shown in Figs. 1 through 5 is disposed within an opening formed in horizontal cooking top 40. The heating unit has a downwardly extending portion 42 that is rotatably supported between a bracket 43 and a U-shaped clamping member 44 secured thereto. The bracket 43 has an arcuate bowl 45 that is welded to a vertically movable member 46. The vertically movable member 46 is vertically adjusted by adjusting screws 47 that drivingly engage a U-shaped nut 48 that is secured to cooking top 40. Each screw 47 has a ledge portion 49 that abuts a rim portion 50 of vertically movable member 46. A spider 51 rests on flanged portion 52 of vertically movable member 46 and engages the heating unit 39 when the heating unit is in a lower horizontal position. A trim ring 53 rests on the cooking top 40 and covers the slotted head portions of the screws 47. The vertically movable member 46 supports a reflector pan 54 that is movable therewith.

With the arrangement of Figs. 6, 7 and 8 the heating unit 39 pivots around the longitudinal axis of the lower downwardly extending portion 42 and thus pivots with respect to bracket 45 and vertically movable member 46. The user of the range desiring to level the heating unit 39 removes the trim ring 53 and then adjusts screws 47 by the insertion of a screwdriver into the slotted heads of the screws. Rotation of screws 47 produces a vertical movement of member 46 which in turn vertically moves spider 51 and heating unit 39. The bracket 43 will also be vertically adjusted as it is secured to vertically movable member 46. It is thus apparent that the heating unit 39 and the bracket 43 are moved vertically whenever the screws 47 are adjusted. This arrangement, like the arrangement of Figs. 1 through 5, provides for very simplified leveling of the heating unit 39 in that the screws 47 are adjustable from the top side of cooking top 40 and without it being necessary to gain access to the underside of cooking top 40.

In the embodiment shown in Figs. 9, 10 and 11 a horizontal cooking top 60 is provided with an opening 62 that receives an electric heating unit 63 of the tubular sheath type. The heating unit is pivotally supported within the opening 62 by a bracket generally designated by reference numeral 64. A U-shaped clamping member 65 is secured to the bracket 64 and rotatably supports the downwardly extending portion 66 of heating unit 63. The lower end 66 of the heating unit thus pivots within U-shaped bracket 65 around the longitudinal axis of the downwardly extending portion 66. The bracket 64, as more particularly shown in Fig. 10, is provided with angularly disposed portions 67 and 69 which meet at 70 to provide a narrow portion that engages the underside of cooking top 60. The angularly disposed portions 67 and 69 of bracket 64 are threaded to receive screws 72 and 74 which pass through cooking top 60. By tightening one of the screws and loosening the other, the bracket 64 may be tilted around the narrow portion 70 which engages the underside of cooking top 60. By tilting the bracket 64 the lower end of the heating unit 66 is moved upwardly and downwardly to provide an initial leveling of the heating unit 63.

The heating unit assembly is also provided with adjusting screws 76 having ledge portions 78 that are threaded into U-shaped nuts 80 which are, in turn, snapped on a flanged portion 81 of cooking top 60. The ledge portions 78 of screws 76 engage a reflector pan 83 at rim portion 83a. The reflector pan 83 has integral inwardly struck portions 85 that engage a spider 84 as shown in Fig. 11. The spider 84 engages the underside of heating unit 63 when the heating unit is in a lower horizontally disposed position. An annular trim ring 86 rests on the cooking top 60 and covers the slotted head ends 87 of screws 76 when the trim ring is in position.

If the user desires to level the heating unit 63, the trim ring 86 is removed. The bracket 64 is then adjusted by adjusting screws 72 and 74 to provide an initial leveling of the heating unit. When this has been accomplished the screws 76 are adjusted to vertically move reflector pan 83, spider 84 and heating unit 63. The adjustment of screws 76 provides for leveling of the heating element 63 by pivotal adjusting movement of heating element 63 due to the fact that the lower end 66 of the heating unit is rotatably mounted within U-shaped bracket 65. The embodiment of Figs. 9, 10 and 11 retains all the simplified adjusting features of the arrangement shown in Figs. 1 through 8 as the screws 76 may be adjusted from the top side of cooking top 60.

While the form of embodiment of the invention as herein disclosed constitutes a preferred form, it is to be understood that other forms might be adopted, as may come within the scope of the claims which follow.

What is claimed is as follows:

1. In combination, a horizontally disposed heating unit support having an opening for the reception of an electrical heating unit, an electric heating unit in said opening, means for supporting and leveling said heating unit including a plurality of substantially vertically disposed adjusting screws interposed between said support and said heating unit, said adjusting screws each having an upper tool engaging portion accessible for adjustment from the top side of said support whereby said heating unit may be leveled by adjustment of said screws without gaining access to the underside of said support.

2. In combination, a horizontally disposed heating unit support having an opening for the reception of an electrical heating unit, an electric heating unit in said opening, means supporting said heating unit for pivotal upward movement with respect to said support, a plurality of substantially vertically disposed adjusting screws interposed between said support and said heating unit supporting said heating unit when said heating unit is in a lower substantially horizontally disposed position, said adjusting screws each having an upper tool engaging portion accessible from the top side of said support whereby said heating unit may be leveled by adjustment of said screws without gaining access to the underside of said support.

3. In combination, a horizontally disposed heating unit support having an opening for the reception of an electrical heating unit, an electric heating unit in said opening pivotally connected to said support for movement upwardly from said support, a plurality of substantially vertically disposed adjusting screws interposed between said support and said heating unit, means movable with said adjusting screws and supporting said heating unit when said heating unit is in a lower position, said adjusting screws each having an upper tool engaging portion accessible from the top side of said support whereby said heating unit may be leveled by adjustment of said screws without gaining access to the underside of said support.

4. In electrical heating apparatus, a cooking top having an opening, an electric heating unit in said opening, means connecting said heating unit with said cooking top, said means being so constructed and arranged as to permit pivotal movement of said heating unit with respect to said cooking top and also permitting vertical movement of the heating unit along a fixed axis, and a plurality of adjusting screws interposed between said heating unit and said cooking top for leveling said heating unit, said adjusting screws each having an upper tool engaging portion accessible for adjustment from the top side of said cooking top whereby said heating unit may be leveled by adjustment of said screws without gaining access to the underside of said cooking top.

5. In electrical heating apparatus, a cooking top having an opening, a heating unit in said opening, an annular trim ring resting on said cooking top and circumscribing said opening, a plurality of adjusting screws carried by said trim ring, and a vertically movable spider for supporting said heating unit supported by said adjusting screws, said adjusting screws each having an upper tool engaging portion accessible for adjustment from the top side of said cooking top whereby said heating unit may be leveled by adjustment of said screws without gaining access to the underside of said cooking top.

6. In electrical heating apparatus, a cooking top having an opening, a vertically adjustable support in said opening, a heating unit pivotally connected to said support, a spider resting on said support for supporting said heating unit, and a plurality of adjusting screws interposed between said cooking top and said support for vertically adjusting said support relative to said cooking top, said adjusting screws each having an upper tool engaging portion accessible for adjustment from the top side of said cooking top whereby said heating unit may be leveled by adjustment of said screws without gaining access to the underside of said cooking top.

7. The structure according to claim 6 wherein a removable annular trim ring is provided that rests on the cooking top and which circumscribes the opening in the cooking top, said trim ring covering the upper tool engaging portions of said screws.

8. In electrical heating apparatus, a cooking top having an opening, an electric heating unit in said opening, a bracket secured to said cooking top and tiltable with respect thereto, means pivotally connecting said heating unit to said bracket, means for tilting said bracket for leveling said heating unit, a vertically movable member supporting said heating unit when said heating unit is in a lower horizontal position, and a plurality of adjusting screws interposed between said movable member and said cooking top, said adjusting screws each having an upper tool engaging portion accessible for adjustment from the top side of said cooking top whereby said heating unit may be leveled by adjustment of said screws without gaining access to the underside of said cooking top.

9. In electrical heating apparatus, a cooking top having an opening, an electric heating unit in said opening, a bracket having a narrow portion engaging said cooking top and tiltable with respect thereto around said narrow portion, a pair of screws engaging said cooking top and having a threaded engagement with said bracket at opposite sides of said narrow portion whereby said bracket is adjusted in its tilting movement by said screws, and means pivotally connecting said heating unit to said bracket.

10. In an electric heater, a cooking top having an opening, an electric heating unit in said opening, and a plurality of substantially vertically arranged adjusting screws interposed between said heating unit and said cooking top for leveling the same, said adjusting screws each having an upper tool engaging portion accessible for adjustment from the top side of said cooking top whereby said heating unit may be leveled by adjustment of said screws without gaining access to the underside of said cooking top.

References Cited in the file of this patent

UNITED STATES PATENTS

| | | |
|---|---|---|
| 2,302,808 | Smith | Nov. 24, 1942 |
| 2,515,579 | Allen | July 18, 1950 |